(12) United States Patent
Eckhardt et al.

(10) Patent No.: US 7,804,649 B2
(45) Date of Patent: Sep. 28, 2010

(54) MICROREPLICATED ACHROMATIC LENS

(75) Inventors: Stephen K. Eckhardt, White Bear Lake, MN (US); James N. Dobbs, Woodbury, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 11/079,023

(22) Filed: Mar. 9, 2005

(65) Prior Publication Data

US 2005/0207031 A1 Sep. 22, 2005

Related U.S. Application Data

(63) Continuation-in-part of application No. 10/657,859, filed on Sep. 9, 2003, now Pat. No. 7,165,959, and a continuation-in-part of application No. 10/658,730, filed on Sep. 9, 2003, now Pat. No. 7,224,529.

(51) Int. Cl.
*G02B 27/10* (2006.01)
*B29D 11/00* (2006.01)

(52) U.S. Cl. ..................................... 359/619

(58) Field of Classification Search ......... 359/619–624; 264/1.6
See application file for complete search history.

(56) References Cited

U.S. PATENT DOCUMENTS

| | | |
|---|---|---|
| 3,241,429 A | 3/1966 | Rice et al. |
| 3,374,303 A | 3/1968 | Metz, Jr. |
| 3,551,544 A | 12/1970 | Hlinka |
| 3,893,795 A | 7/1975 | Nauta |
| 3,917,772 A | 11/1975 | Hollenbeck |
| 4,078,416 A | 3/1978 | Voorhees et al. |
| 4,177,304 A | 12/1979 | Berry |
| 4,249,878 A | 2/1981 | Komarek |
| 4,280,978 A | 7/1981 | Dannheim et al. |
| 4,414,316 A | 11/1983 | Conley |
| 4,420,502 A | 12/1983 | Conley |
| 4,448,739 A | 5/1984 | Baus |
| 4,469,645 A * | 9/1984 | Eigenmann ................. 264/1.6 |
| 4,615,090 A | 10/1986 | Baus |
| 4,744,936 A | 5/1988 | Bittner, Jr. |
| 4,781,975 A | 11/1988 | Baus |
| 4,836,874 A | 6/1989 | Foster |

(Continued)

FOREIGN PATENT DOCUMENTS

CA 2244324 2/1999

(Continued)

OTHER PUBLICATIONS

Dictionary Excerpt: *Webster's Ninth New Collegiate Dictionary*, Merriam-Webster Inc., 1990, pp. 992 and 1169.

(Continued)

*Primary Examiner*—Alicia M Harrington
(74) *Attorney, Agent, or Firm*—Daniel R. Pastirik

(57) ABSTRACT

A microreplicated achromatic lens is disclosed. The article includes a web including first and second opposed surfaces. The first surface includes a first microreplicated structure having a plurality of first features. The second surface includes a second microreplicated structure having a plurality of second features. Opposing first and second features are registered to within 10 micrometers. Corresponding opposed first and second features cooperate to form an achromatic microlens element.

19 Claims, 9 Drawing Sheets

U.S. PATENT DOCUMENTS

| | | | |
|---|---|---|---|
| 4,892,336 A | 1/1990 | Kaule et al. | |
| 5,028,361 A | 7/1991 | Fujimoto | |
| 5,087,191 A | 2/1992 | Heise et al. | |
| 5,164,227 A | 11/1992 | Miekka et al. | |
| 5,177,637 A | 1/1993 | Tsukada | |
| 5,259,926 A | 11/1993 | Kuwabara et al. | |
| 5,330,799 A | 7/1994 | Sandor et al. | |
| 5,333,072 A | 7/1994 | Willett | |
| 5,393,475 A | 2/1995 | Murasaki et al. | |
| 5,425,848 A | 6/1995 | Haisma et al. | |
| 5,498,385 A | 3/1996 | Yabusa et al. | |
| 5,540,147 A | 7/1996 | Johnson | |
| 5,579,164 A | 11/1996 | Chapnik | |
| 5,592,332 A | 1/1997 | Nishio et al. | |
| 5,598,280 A | 1/1997 | Nishio et al. | |
| 5,615,045 A | 3/1997 | Takuma et al. | |
| 5,691,846 A | 11/1997 | Benson, Jr. et al. | |
| 5,728,449 A | 3/1998 | Steininger et al. | |
| 5,759,455 A | 6/1998 | Kamitakahara et al. | |
| 5,800,723 A | 9/1998 | Juskey et al. | |
| 5,922,238 A | 7/1999 | Savant et al. | |
| 6,024,455 A | 2/2000 | O'Neill et al. | |
| 6,025,897 A | 2/2000 | Weber et al. | |
| 6,074,192 A | 6/2000 | Mikkelsen | |
| 6,124,971 A | 9/2000 | Ouderkirk et al. | |
| 6,187,250 B1 | 2/2001 | Champagne | |
| 6,197,397 B1 | 3/2001 | Sher et al. | |
| 6,272,275 B1 | 8/2001 | Cortright et al. | |
| 6,272,982 B1 | 8/2001 | Stauffacher et al. | |
| 6,280,063 B1 | 8/2001 | Fong et al. | |
| 6,325,880 B1 | 12/2001 | Yamashita et al. | |
| 6,354,709 B1 | 3/2002 | Campbell et al. | |
| 6,358,030 B1 | 3/2002 | Ampulski | |
| 6,368,682 B1 | 4/2002 | Fong | |
| 6,373,636 B1 | 4/2002 | Conley | |
| 6,381,071 B1 | 4/2002 | Dona et al. | |
| 6,483,976 B2 | 11/2002 | Shie et al. | |
| 6,495,214 B1 | 12/2002 | Prix et al. | |
| 6,550,383 B2 | 4/2003 | Kitai | |
| 6,552,848 B2 | 4/2003 | Kobayashi | |
| 6,577,358 B1 | 6/2003 | Arakawa et al. | |
| 6,592,802 B1 | 7/2003 | Goto et al. | |
| 6,628,460 B1 | 9/2003 | Ookawa et al. | |
| 6,630,970 B2 | 10/2003 | Trapani et al. | |
| 6,724,536 B2 * | 4/2004 | Magee | 359/619 |
| 6,767,594 B1 | 7/2004 | Miroshin et al. | |
| 6,870,674 B2 | 3/2005 | Ookawa et al. | |
| 6,908,295 B2 | 6/2005 | Thielman et al. | |
| 6,963,184 B2 | 11/2005 | Carlson | |
| 7,101,437 B2 | 9/2006 | Boutilier et al. | |
| 7,106,517 B2 | 9/2006 | Olczak | |
| 7,121,693 B2 | 10/2006 | Klose | |
| 7,140,812 B2 | 11/2006 | Bryan et al. | |
| 7,165,959 B2 | 1/2007 | Humlicek et al. | |
| 7,224,529 B2 | 5/2007 | King et al. | |
| 7,417,798 B2 | 8/2008 | King et al. | |
| 7,444,932 B2 | 11/2008 | Strand et al. | |
| 2001/0030805 A1 | 10/2001 | Sawaki et al. | |
| 2002/0141790 A1 | 10/2002 | Kamimura et al. | |
| 2002/0177082 A1 | 11/2002 | Brady et al. | |
| 2002/0196563 A1 * | 12/2002 | Itoh | 359/741 |
| 2003/0075262 A1 | 4/2003 | Hein et al. | |
| 2003/0075269 A1 | 4/2003 | Prix et al. | |
| 2003/0081331 A1 * | 5/2003 | Abe | 359/796 |
| 2003/0102591 A1 | 6/2003 | Thielman et al. | |
| 2003/0108710 A1 | 6/2003 | Coyle et al. | |
| 2003/0129385 A1 | 7/2003 | Hojo et al. | |
| 2004/0027675 A1 | 2/2004 | Wu et al. | |
| 2004/0075897 A1 | 4/2004 | Ookawa et al. | |
| 2004/0094262 A1 | 5/2004 | Canti | |
| 2004/0156130 A1 | 8/2004 | Powell et al. | |
| 2005/0008821 A1 | 1/2005 | Pricone | |
| 2005/0051931 A1 | 3/2005 | Humlicek et al. | |
| 2005/0052750 A1 | 3/2005 | King et al. | |
| 2005/0224997 A1 | 10/2005 | Liao et al. | |
| 2005/0276071 A1 | 12/2005 | Sasagawa et al. | |
| 2006/0061869 A1 * | 3/2006 | Fadel et al. | 359/619 |
| 2006/0062969 A1 | 3/2006 | Honda | |
| 2006/0209428 A1 | 9/2006 | Dobbs et al. | |
| 2006/0210714 A1 | 9/2006 | Huizinga et al. | |
| 2006/0210770 A1 | 9/2006 | Nelson et al. | |
| 2006/0236877 A1 | 10/2006 | Strand et al. | |
| 2006/0251803 A1 | 11/2006 | Huizinga et al. | |
| 2007/0141249 A1 | 6/2007 | Humlicek et al. | |
| 2008/0131667 A1 | 6/2008 | King et al. | |

FOREIGN PATENT DOCUMENTS

| | | | |
|---|---|---|---|
| DE | 32 06 164 | | 9/1982 |
| EP | 0 405 898 | | 1/1991 |
| EP | 0 623 440 | | 11/1994 |
| EP | 0 814 300 | | 12/1997 |
| EP | 0961138 | | 12/1999 |
| EP | 1352732 | A2 | 10/2003 |
| EP | 1 473 594 | | 11/2004 |
| JP | 01-159627 | * | 6/1989 |
| JP | 04-299329 | * | 10/1992 |
| JP | 07-148856 | | 6/1995 |
| JP | 07-175131 | | 7/1995 |
| JP | 2000-183253 | | 6/2000 |
| JP | 2002-287256 | | 10/2002 |
| JP | 2005-007873 | | 1/2005 |
| WO | WO 93/23244 | | 11/1993 |
| WO | WO 94/01288 | | 1/1994 |
| WO | WO 98/52733 | | 11/1998 |
| WO | WO 99/00700 | | 1/1999 |
| WO | WO 2001/27527 | | 4/2001 |
| WO | WO 2002/04858 | | 1/2002 |
| WO | WO 2004/099823 | | 11/2004 |

OTHER PUBLICATIONS

Article: Sasagawa, "P.51: Dual Directional Backlight for Stereoscopic LCD," *SID 03 Digest*, (2003), pp. 1-3.

* cited by examiner

MICROREPLICATED ACHROMATIC LENS

CROSS REFERENCE

This is a continuation-in-part application of U.S. patent application Ser. No. 10/657,859 now U.S. Pat No. 7,165,959, and U.S. patent application Ser. No. 10/658,730 now U.S. Pat. No. 7,224,529, both filed Sep. 9, 2003, and incorporated by reference herein.

FIELD

The disclosure relates generally to the continuous casting of material onto a web, and more specifically to the casting of achromatic lenses having a high degree of registration between the patterns cast on opposite sides of the web.

BACKGROUND

In the fabrication of many articles, from the printing of newspapers to the fabrication of sophisticated electronic and optical devices, it is necessary to apply some material that is at least temporarily in liquid form to opposite sides of a substrate. It is often the case that the material applied to the substrate is applied in a predetermined pattern; in the case of e.g. printing, ink is applied in the pattern of letters and pictures. It is common in such cases for there to be at least a minimum requirement for registration between the patterns on opposite sides of the substrate.

When the substrate is a discrete article such as a circuit board, the applicators of a pattern may usually rely on an edge to assist in achieving registration. But when the substrate is a web and it is not possible to rely on an edge of the substrate to periodically refer to in maintaining registration, the problem becomes a bit more difficult. Still, even in the case of webs, when the requirement for registration is not severe, e.g. a drift out of perfect registration of greater than 100 micrometers is tolerable, mechanical expedients are known for controlling the material application to that extent. The printing art is replete with devices capable of meeting such a standard.

However, in some products having patterns on opposite sides of a substrate, a much more accurate registration between the patterns is required. In such a case, if the web is not in continuous motion, apparatuses are known that can apply material to such a standard. And if the web is in continuous motion, if it is tolerable, as in e.g. some types of flexible circuitry, to reset the patterning rolls to within 100 micrometers, or even 5 micrometers, of perfect registration once per revolution of the patterning rolls, the art still gives guidelines about how to proceed.

However, in e.g. optical articles such as brightness enhancement films, it is required for the patterns in the optically transparent polymer applied to opposite sides of a substrate to be out of registration by no more than a very small tolerance at any point in the tool rotation. Thus far, the art is silent about how to cast a patterned surface on opposite sides of a web that is in continuous motion so that the patterns are kept continuously, rather than intermittently, in registration within 100 micrometers.

SUMMARY

One aspect of the present disclosure is directed to a microreplicated achromatic lens element. The microreplicated achromatic lens element includes a flexible substrate having first and second opposed surfaces. A first coated microreplicated pattern is disposed on the first surface and a second coated microreplicated pattern is disposed on the second surface. The first and second patterns are registered to within 10 micrometers and form an achromatic lens. In some embodiments, a plurality of achromatic lenses are formed on the substrate and have a period in a range of 10 to 1000 micrometers and a height in a range of 5 to 800 micrometers and lens patterns are registered within 5 micrometers, or 3 micrometers or 1 micrometer.

Another aspect of the present disclosure is directed to a method of making a microreplicated achromatic lens element. The method includes providing a substrate, in web form, having first and second opposed surfaces, and passing the substrate through a roll to roll casting apparatus to form a plurality of achromatic lens features. The achromatic lens features include a first microreplicated positive lens on the first surface and a second microreplicated negative lens on the second surface. The first and second microreplicated lenses are registered to within about 10 micrometers.

DEFINITIONS

In the context of this disclosure, "registration," means the positioning of structures on one surface of the web in a defined relationship to other structures on the opposite side of the same web.

In the context of this disclosure, "web" means a sheet of material having a fixed dimension in one direction and either a predetermined or indeterminate length in the orthogonal direction.

In the context of this disclosure, "continuous registration," means that at all times during rotation of first and second patterned rolls the degree of registration between structures on the rolls is better than a specified limit.

In the context of this disclosure, "microreplicated" or "microreplication" means the production of a microstructured surface through a process where the structured surface features retain an individual feature fidelity during manufacture, from product-to-product, that varies no more than about 100 micrometers.

In the context of this disclosure, "achromatic" or "achromat," lens means a lens that is corrected to bring two specified or distinct wavelengths to a common focal point.

BRIEF DESCRIPTION OF THE DRAWINGS

In the several figures of the attached drawing, like parts bear like reference numerals, and.

DETAILED DESCRIPTION

Generally, the disclosure of the present disclosure is directed to a flexible substrate coated with microreplicated patterned structures on each side. The microreplicated articles are registered with respect to one another to a high degree of precision. Preferably, the structures on opposing sides cooperate to give the article achromatic optical qualities.

Figure 1:
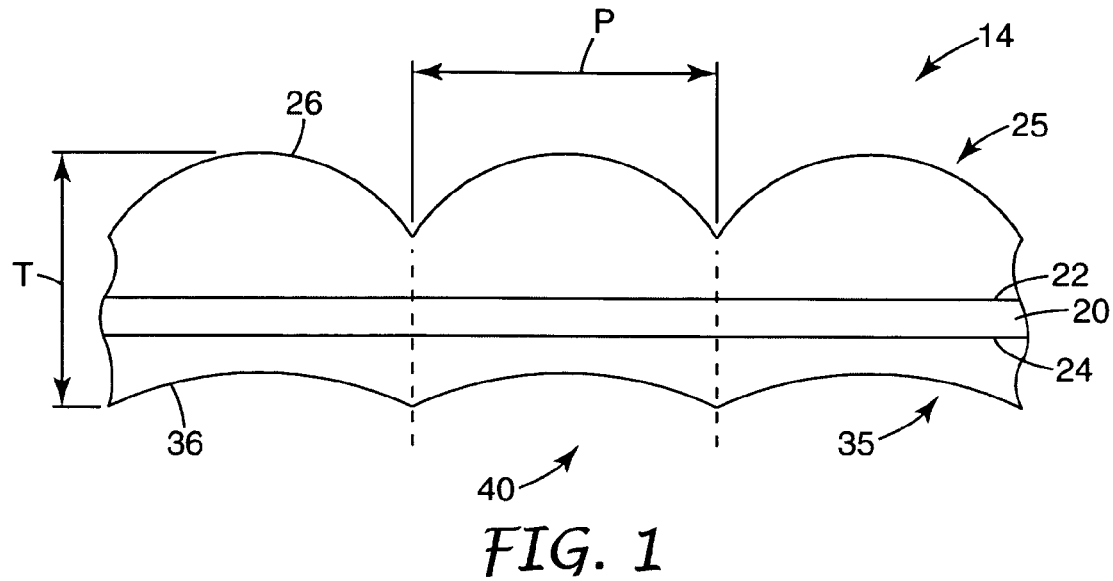
FIG. 1 illustrates a cross-sectional view of an article made according to the present disclosure.

Referring to FIG. 1, illustrated is an example embodiment of a two-sided microreplicated achromatic article 14. The article 14 includes a web 20 substrate having opposed first and second surfaces 22 and 24. First and second surfaces 22 and 24 include first and second microreplicated structures 25 and 35, respectively. First microreplicated structure 25 includes a plurality of non-planar features 26, which can be spherical, aspherical, cylindrical, or acylindrical, as desired. In the illustrated embodiment aspherical or acylindrical lenses 26 are shown with a pitch or period P of about of 1 millimeter or less, or 1 to 500 micrometers, or 150 to 300 micrometers, or 5 to 50 micrometers, or 8 to 25 micrometers, as desired. The non-planar features 26 can form a plurality of positive lenses 25.

Second microreplicated structure 35 includes a plurality non-planar features 36, which can be spherical, aspherical, cylindrical, or acylindrical, as desired. In the illustrated embodiment spherical or cylindrical lenses 36 are shown with a pitch or period P substantially matching or matching the pitch or period P of the aspherical or acylindrical lenses 26. In the illustrated embodiment, first and second microreplicated structures 25 and 35 have the same pitch or period of repetition P. The microreplicated achromatic article 14 has a height of T, which can be any useful height. In some embodiments, the height T is less than 1 millimeter, or 5 to 800 micrometers, or 5 to 50 micrometers, or 200 to 500 micrometers, or 100 to 200 micrometers, as desired.

In the example embodiment shown, opposed microreplicated features 26 and 36 cooperate to form a plurality of achromatic lens elements 40. Since the performance of each achromatic lens element 40 is a function of the registration or alignment of the opposed features 26 and 36 forming each achromatic lens, precision alignment or registration of the lens features is useful. In some embodiments, the opposed features 26 and 36 are aligned or in registration to within 5%, or within 2%, or within 1% of the pitch or period P of each achromatic lens element 40. In illustrative embodiments, the opposed features 26 and 36 are aligned or in registration to within 10 micrometers, or within 5 micrometers, or within 3 micrometers, or within 1 micrometer of the each achromatic lens element 40.

The article 14 described above can be made using an apparatus and method for producing precisely aligned microreplicated structures on opposed surfaces of the web, the apparatus and methods which are described in detail below. In one embodiment the web or substrate 20 includes polyethylene terephthalate (PET), about 25 to 100 micrometers thick. Other web materials can be used, for example, polycarbonate.

In illustrative embodiments, the plurality of aspherical or acylindrical positive lens features 26 can made on a first patterned roll by casting and curing a first curable liquid onto the first side 22 of the web 20. The first curable liquid can include a photocurable low dispersion material such as, for example a polyacrylate resin solution. The plurality of spherical or cylindrical negative lens features 36 can be made on a second patterned roll by casting and curing a second curable liquid onto the second side 24 of the web 20. The second curable liquid can include a photocurable high dispersion material such as, for example a polycarbonate or polystyrene resin solution. The aspherical or acylindrical positive lens feature 26 shape and material selection and the spherical or cylindrical negative lens feature 36 shape and material selection are determined by one skilled in the art to provide an achromatic lens element 40.

Figure 2:
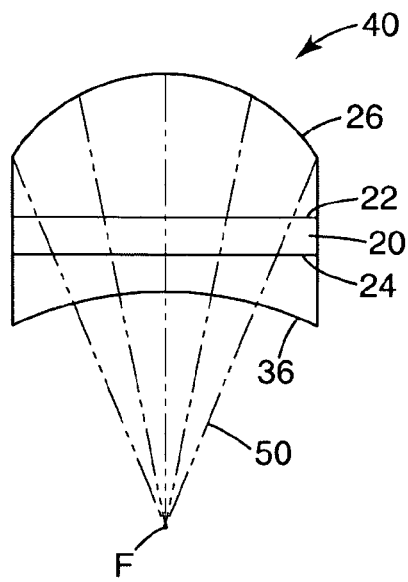
FIG. 2 illustrates a cross-sectional view of a single illustrative achromatic lens element of FIG. 1.

FIG. 2 illustrates a cross-sectional view of a single illustrative achromatic lens element 40 of FIG. 1. In the illustrated embodiment, light 50 travels through the achromatic lens element 40 and focuses on a single focal point F. In some embodiments, the achromatic lens element 40 has a virtual focal point. In the illustrated embodiment, the lens element 40 is an achromatic doublet 26, 36 disposed on opposing sides 22, 24 of the substrate 20, as described above. In some embodiments, the achromatic lens element 40 is designed to correct longitudinal chromatic aberration with respect to two different wavelengths, e.g., F-line (486 nm) and C-line (656 nm). That is, the light beams 50 of the F-line and the C-line are focused on substantially the same focal point F.

After each respective structure is cast into a pattern, each respective pattern can be cured using a curing light source such as, for example, an ultraviolet light source. A peel roll can then used to remove the microreplicated article from the second patterned roll. Optionally, a release agent or coating can be used to assist removal of the patterned structures from the patterned tools.

Exemplary process settings used to create articles described above are as follows. A web speed of about 1.0 feet per minute with a web tension into and out of casting apparatus of about 2.0 pounds force. A peel roll draw ratio of about 5% to pull the web off the second patterned tool. A nip pressure of about 4.0 pounds force. A gap between the first and second patterned rolls of about 0.010 inches. Resin can be disposed on the first surface of the web using a dropper coating apparatus and resin can be disposed on the second surface at a rate of about 1.35 ml/min, using a syringe pump.

Curing the first microreplicated structure can be accomplished with any useful curing apparatus such as, for example, an Oriel 200-500 W Mercury Arc Lamp at maximum power and a Fostec DCR II at maximum power, with all the components mounted sequentially. Curing the second microreplicated structure can also be accomplished with a Spectral Energy UV Light Source, a Fostec DCR II at maximum power, and an RSLI Inc. Light Pump 150 MHS, with all the components mounted sequentially.

Generally, the disclosure of the present disclosure can be made by a system and method, disclosed hereinafter, for producing two-sided microreplicated structures with side-to-side registration of better than about 100 micrometers, or better than 50 micrometers, or less than 25 micrometers, or less than 10 micrometers, or less than 5 micrometers, or less than 1 micrometer. The system generally includes a first patterning assembly and a second patterning assembly. Each respective assembly creates a microreplicated pattern on a respective surface of a web having a first and a second surface. A first pattern is created on the first side of the web and a second pattern is created on the second surface of the web.

Each patterning assembly includes means for applying a coating, a patterning member, and a curing member. Typically, patterning assemblies include patterned rolls and a support structure for holding and driving each roll. Coating means of the first patterning assembly dispenses a first curable coating material on a first surface of the web. Coating means of the second patterning assembly dispenses a second curable coating material on a second surface of the web, wherein the second surface is opposite the first surface.

After the first coating material is placed on the web, the web passes over a first patterned member, wherein a pattern is created in the first coating material. The first coating material is then cured or cooled to form the first pattern. Subsequently, after the second coating material is placed on the web, the web passes over a second patterned member, wherein a pattern is created in the second coating material. The second coating material is then cured to form the second pattern. Typically, each patterned member is a microreplicated tool and each tool typically has a dedicated curing member for curing the material. However, it is possible to have a single curing member that cures both first and second patterned materials. Also, it is possible to place the coatings on the patterned tools.

The system also includes means for rotating the first and second patterned rolls such that their patterns are transferred to opposite sides of the web while it is in continuous motion, and said patterns are maintained in continuous registration on said opposite sides of the web to better than about 100 micrometers.

An advantage of the present disclosure is that a web having a microreplicated structure on each opposing surface of the web can be manufactured by having the microreplicated structure on each side of the web continuously formed while keeping the microreplicated structures on the opposing sides registered generally to within 100 micrometer (or better as described above.)

Figure 3:
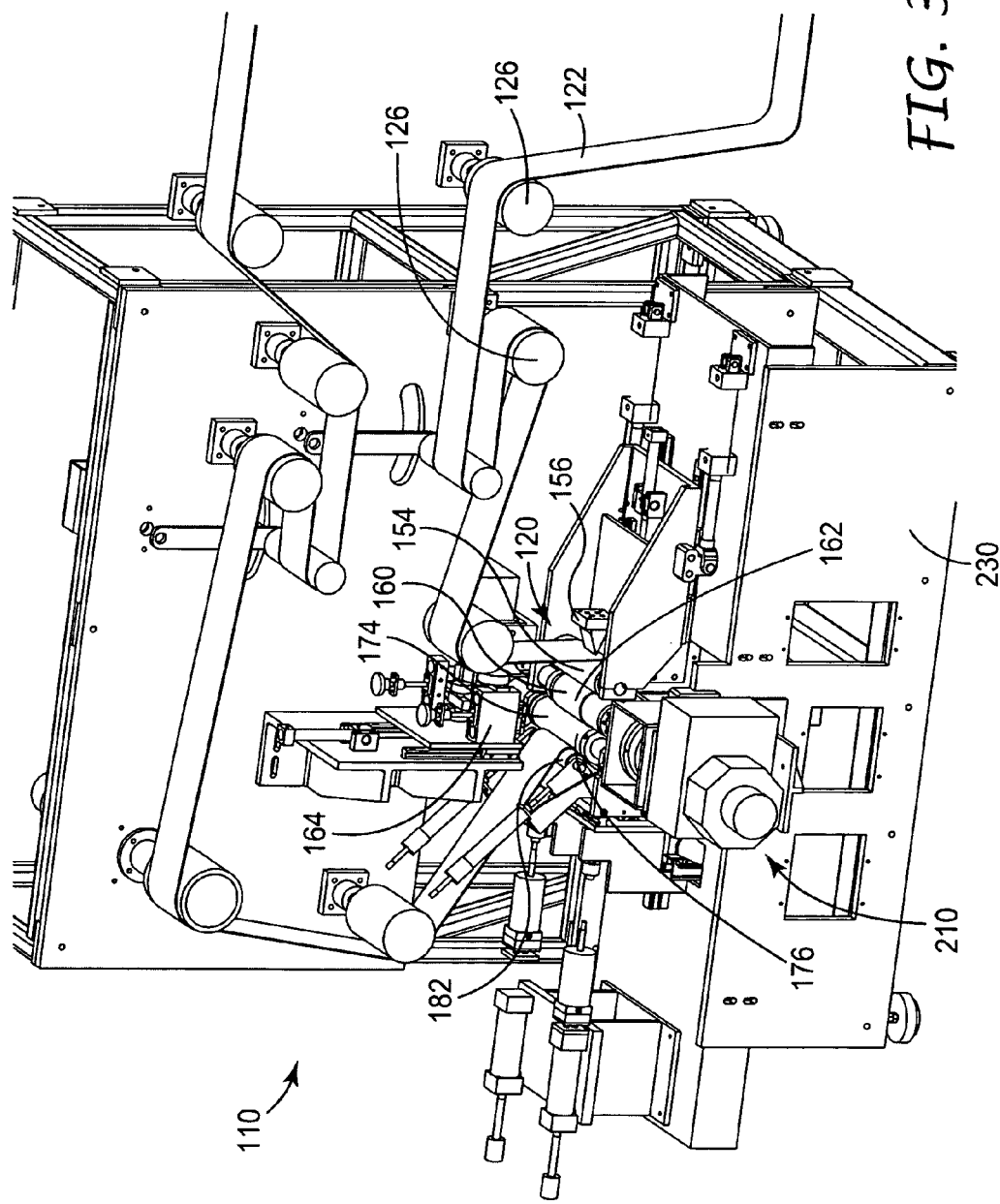
FIG. 3 illustrates a perspective view of an example embodiment of a system including a system according to the present disclosure.
Figure 4:
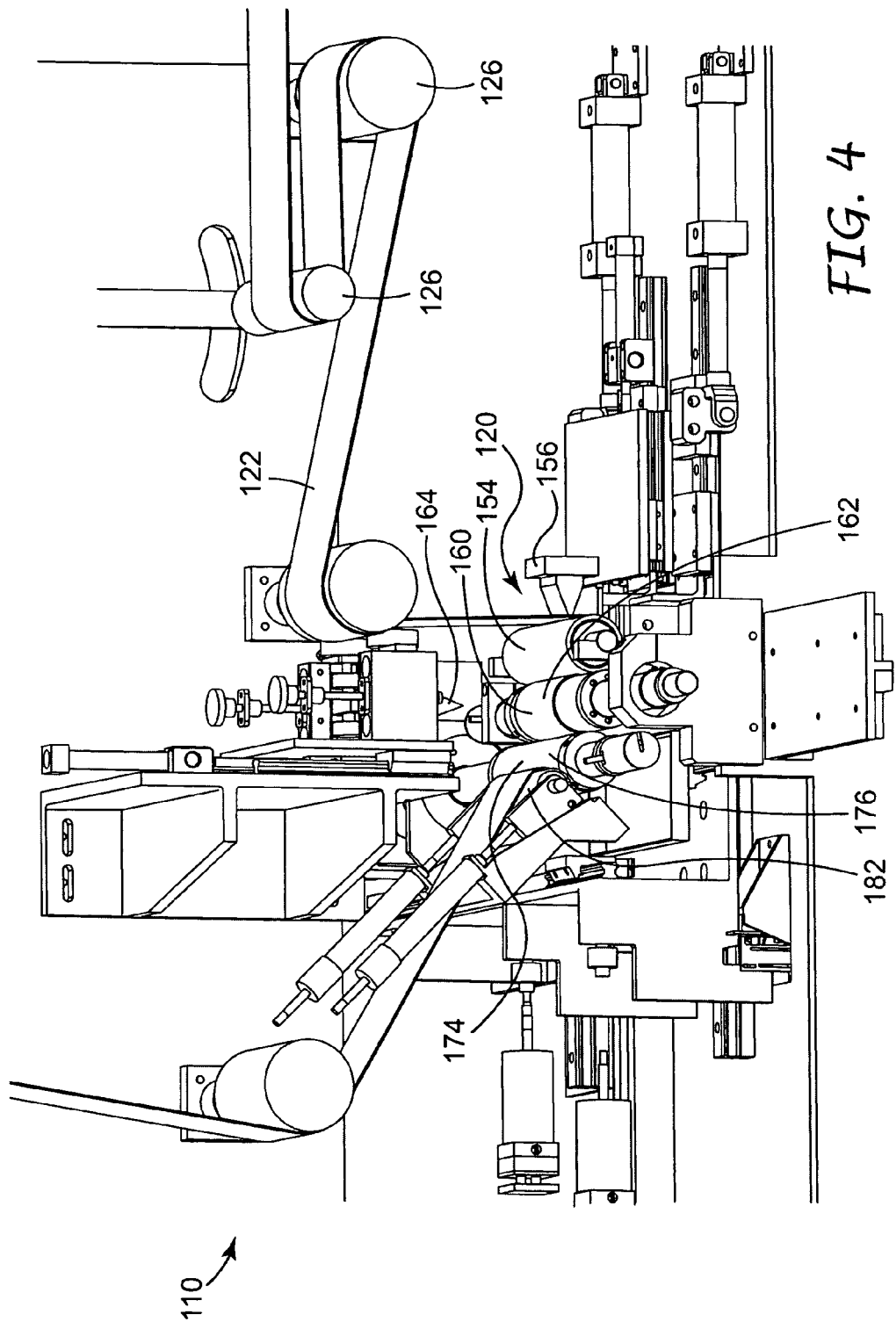
FIG. 4 illustrates a close-up view of a portion of the system of FIG. 1 according to the present disclosure.

Referring now to FIGS. 3-4, an example embodiment of a system 110 including a roll to roll casting apparatus 120 is illustrated. In the depicted casting apparatus 120, a web 122 is provided to the casting apparatus 120 from a main unwind spool (not shown). The exact nature of web 122 can vary widely, depending on the product being produced. However, when the casting apparatus 120 is used for the fabrication of optical articles it is usually convenient for the web 122 to be translucent or transparent, to allow curing through the web 122. The web 122 is directed around various rollers 126 into the casting apparatus 120.

Accurate tension control of the web 122 is beneficial in achieving optimal results, so the web 122 may be directed over a tension-sensing device (not shown). In situations where it is desirable to use a liner web to protect the web 122, the liner web is typically separated at the unwind spool and directed onto a liner web wind-up spool (not shown). The web 122 can be directed via an idler roll to a dancer roller for precision tension control. Idler rollers can direct the web 122 to a position between nip roller 154 and first coating head 156.

A variety of coating methods may be employed. In the illustrated embodiment, first coating head 156 is a die coating head. The web 122 then passes between the nip roll 154 and first patterned roll 160. The first patterned roll 160 has a patterned surface 162, and when the web 122 passes between the nip roller 154 and the first patterned roll 160 the material dispensed onto the web 122 by the first coating head 156 is shaped into a negative of patterned surface 162.

While the web 122 is in contact with the first patterned roll 160, material is dispensed from second coating head 164 onto the other surface of web 122. In parallel with the discussion above with respect to the first coating head 156, the second coating head 164 is also a die coating arrangement including a second extruder (not shown) and a second coating die (not shown). In some embodiments, the material dispensed by the first coating head 156 is a composition including a polymer precursor and intended to be cured to solid polymer with the application of curing energy such as, for example, ultraviolet radiation.

Material that has been dispensed onto web 122 by the second coating head 164 is then brought into contact with second patterned roll 174 with a second patterned surface 176. In parallel with the discussion above, in some embodiments, the material dispensed by the second coating head 164 is a composition including a polymer precursor and intended to be cured to solid polymer with the application of curing energy such as, for example, ultraviolet radiation.

At this point, the web 122 has had a pattern applied to both sides. A peel roll 182 may be present to assist in removal of the web 122 from second patterned roll 174. In some instances, the web tension into and out of the roll to roll casting apparatus is nearly constant.

The web 122 having a two-sided microreplicated pattern is then directed to a wind-up spool (not shown) via various idler rolls. If an interleave film is desired to protect web 122, it may be provided from a secondary unwind spool (not shown) and the web and interleave film are wound together on the wind-up spool at an appropriate tension.

Figure 5:
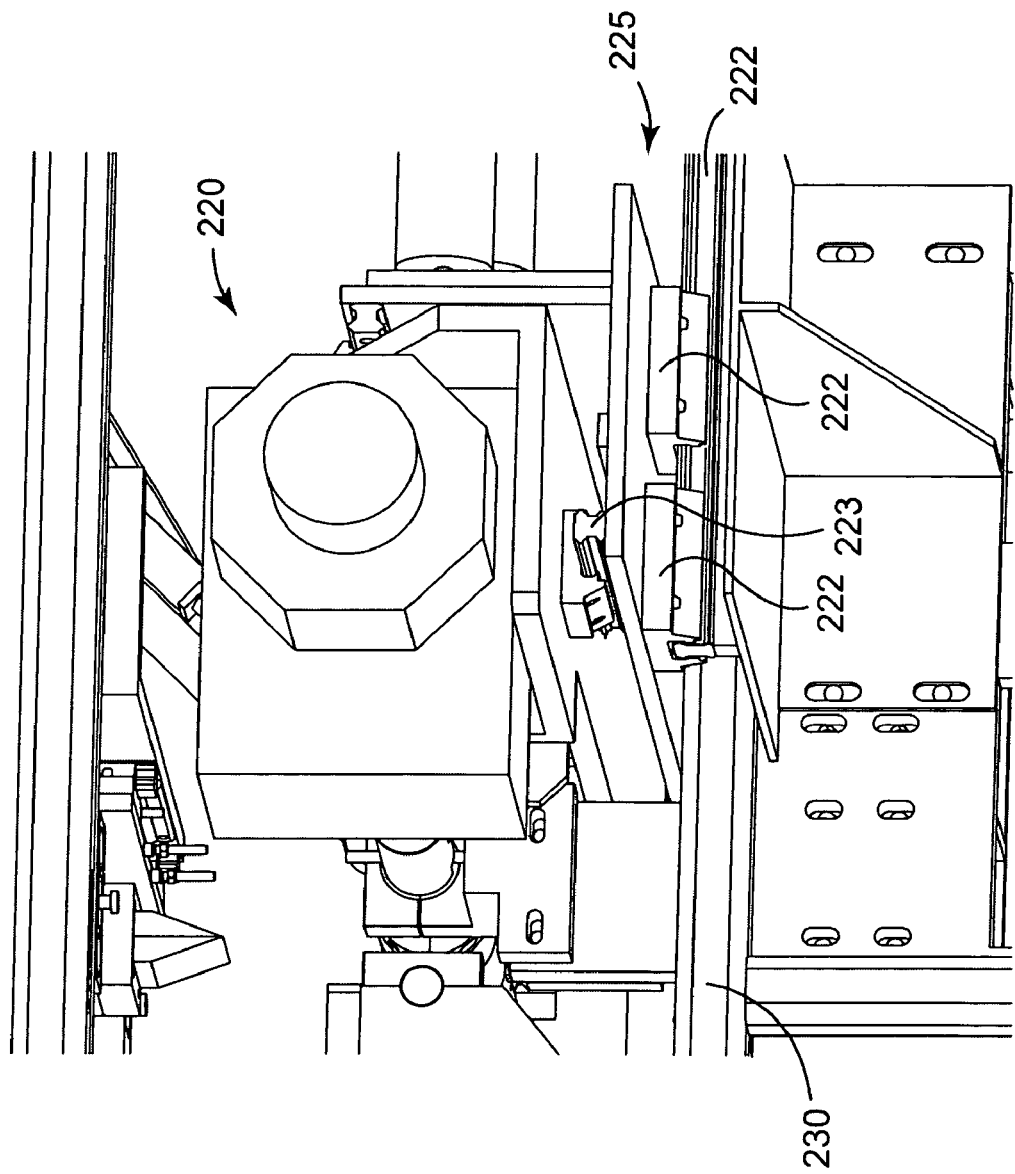
FIG. 5 illustrates another perspective view of the system of FIG. 1 according to the present disclosure.

Referring to FIGS. 3-5, first and second patterned rolls are coupled to first and second motor assemblies 210, 220, respectively. Support for the motor assemblies 210, 220 is accomplished by mounting assemblies to a frame 230, either directly or indirectly. The motor assemblies 210, 220 are coupled to the frame using precision mounting arrangements. In the example embodiment shown, first motor assembly 210 is fixedly mounted to frame 230. Second motor assembly 220, which is placed into position when web 122 is threaded through the casting apparatus 120, may need to be positioned repeatedly and is therefore movable, both in the cross- and machine direction. Movable motor arrangement 220 may be coupled to linear slides 222 to assist in repeated accurate positioning, for example, when switching between patterns on the rolls. Second motor arrangement 220 also includes a second mounting arrangement 225 on the backside of the frame 230 for positioning the second patterned roll 174 side-to-side relative to the first patterned roll 160. In some cases, second mounting arrangement 225 includes linear slides 223 allowing accurate positioning in the cross machine directions.

Figure 6:
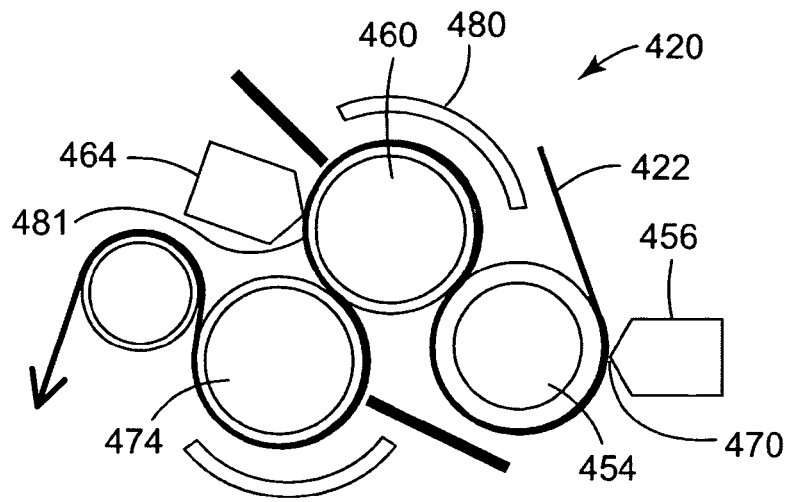
FIG. 6 illustrates a schematic view of an example embodiment of a casting apparatus according to the present disclosure.

Referring to FIG. 6, an example embodiment of a casting apparatus 420 for producing a two-sided web 422 with registered microreplicated structures on opposing surfaces is illustrated. Assembly includes first and second coating means 456, 464, a nip roller 454, and first and second patterned rolls 460, 474. Web 422 is presented to the first coating means 456, in this example a first extrusion die 456. First die 456 dispenses a first curable liquid layer coating 470 onto the web 422. First coating 470 is pressed into the first patterned roller 460 by means of a nip roller 454, typically a rubber covered roller. While on the first patterned roll 460, the coating is cured using a curing source 480, for example, a lamp, of suitable wavelength light, such as, for example, an ultraviolet light source.

A second curable liquid layer 481 is coated on the opposite side of the web 422 using a second side extrusion die 464. The second layer 481 is pressed into the second patterned tool roller 474 and the curing process repeated for the second coating layer 481. Registration of the two coating patterns is achieved by maintaining the tool rollers 460, 474 in a precise angular relationship with one another, as will be described hereinafter.

Figure 7:
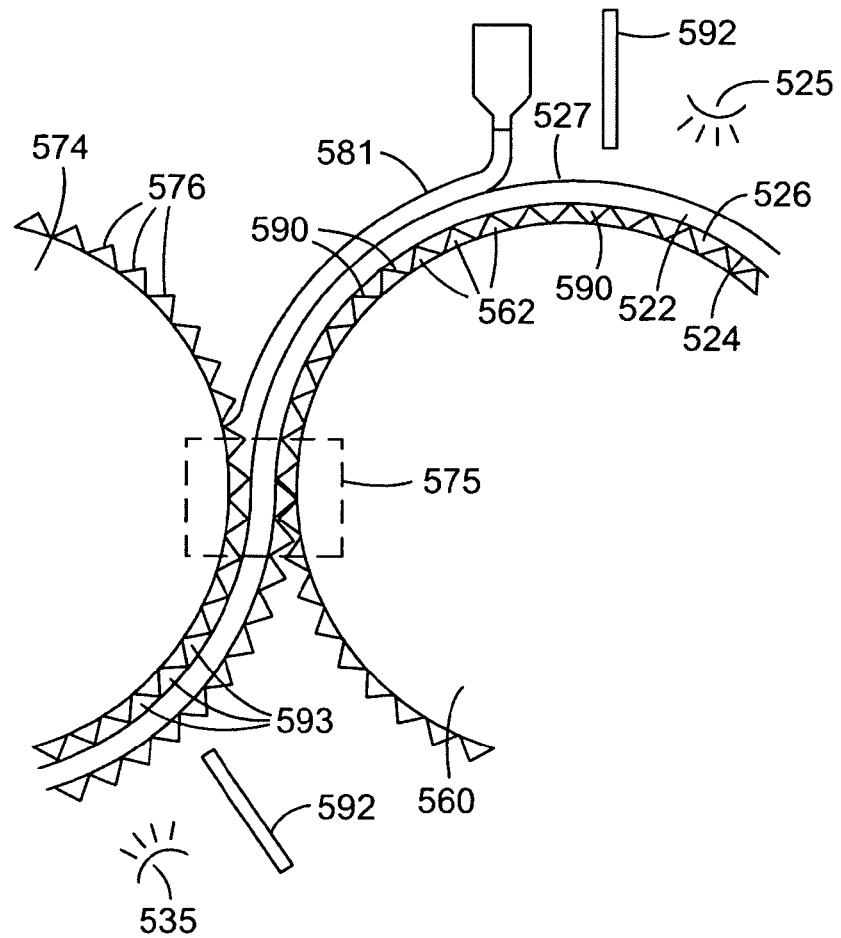
FIG. 7 illustrates a close-up view of a section of the casting apparatus of FIG. 4 according to the present disclosure.

Referring to FIG. 7, a close-up view of a portion of first and second patterned rolls 560, 574 is illustrated. First patterned roll 560 has a first pattern 562 for forming a microreplicated surface. Second pattern roll 574 has a second microreplicated pattern 576. In the example embodiment shown, first and second patterns 562, 576 are the same pattern, though the patterns may be different. In the illustrated embodiment, the first pattern 562 and the second pattern 576 are shown as prism structures, however, any single or multiple useful structures can form the first pattern 562 and the second pattern 576. In an illustrative embodiment, first pattern 562 can be an aspherical negative lens structure and the second pattern 576 can be an aspherical negative lens structure, or vice versa.

As a web 522 passes over the first roll 560, a first curable liquid (not shown) on a first surface 524 is cured by a curing light source 525 near a first region 526 on the first patterned roll 560. A first microreplicated patterned structure 590 is formed on the first side 524 of the web 522 as the liquid is cured. The first patterned structure 590 is a negative of the pattern 562 on the first patterned roll 560. After the first patterned structure 590 is formed, a second curable liquid 581 is dispensed onto a second surface 527 of the web 522. To insure that the second liquid 581 is not cured prematurely, the second liquid 581 can be isolated from the first curing light 525, by a locating the first curing light 525 so that it does not fall on the second liquid 581. Alternatively, shielding means 592 can be placed between the first curing light 525 and the second liquid 581. Also, the curing sources can be located inside their respective patterned rolls where it is impractical or difficult to cure through the web.

After the first patterned structure 590 is formed, the web 522 continues along the first roll 560 until it enters the gap region 575 between the first and second patterned rolls 560, 574. The second liquid 581 then engages the second pattern 576 on the second patterned roll and is shaped into a second microreplicated structure, which is then cured by a second curing light 535. As the web 522 passes into the gap 575 between first and second patterned rolls 560, 574, the first patterned structured 590, which is by this time substantially cured and bonded to the web 522, restrains the web 522 from slipping while the web 522 begins moving into the gap 575 and around the second patterned roller 574. This removes web stretching and slippages as a source of registration error between the first and second patterned structures formed on the web.

By supporting the web 522 on the first patterned roll 560 while the second liquid 581 comes into contact with the second patterned roll 574, the degree of registration between the first and second microreplicated structures 590, 593 formed on opposite sides 524, 527 of the web 522 becomes a function of controlling the positional relationship between the surfaces of the first and second patterned rolls 560, 574. The S-wrap of the web around the first and second patterned rolls 560, 574 and between the gap 575 formed by the rolls minimizes effects of tension, web strain changes, temperature, microslip caused by mechanics of nipping a web, and lateral position control. Typically, the S-wrap maintains the web 522 in contact with each roll over a wrap angle of 180 degrees, though the wrap angle can be more or less depending on the particular requirements.

To increase the degree of registration between the patterns formed on opposite surfaces of a web, it preferred to have a low-frequency pitch variation around the mean diameter of each roll. Typically, the patterned rolls are of the same mean diameter, though this is not required. It is within the skill and knowledge of one having ordinary skill in the art to select the proper roll for any particular application.

Figure 8:
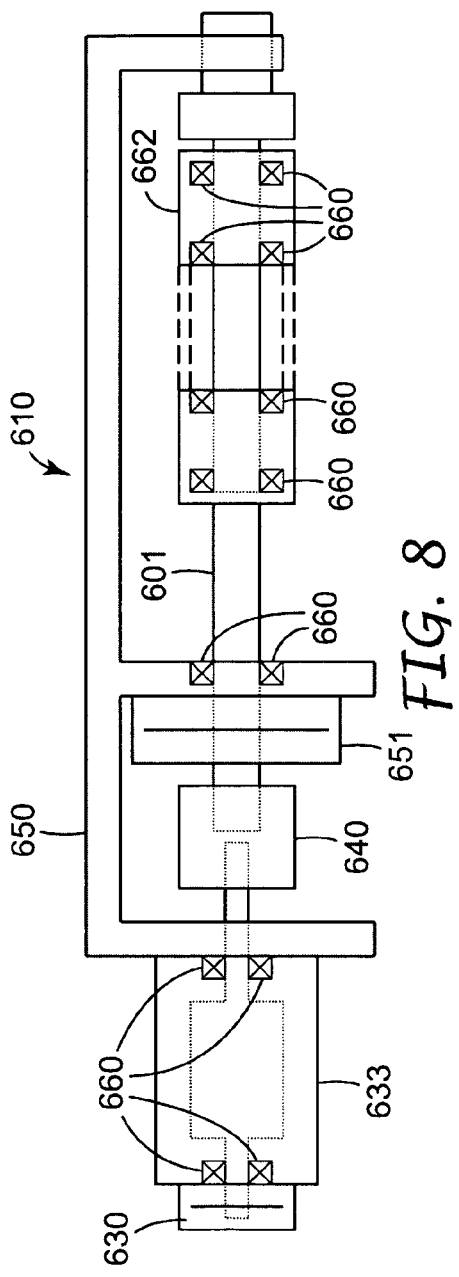
FIG. 8 illustrates a schematic view of an example embodiment of a roll mounting arrangement according to the present disclosure.

Referring to FIG. 8, a motor mounting arrangement is illustrated. A motor 633 for driving a tool or patterned roll 662 is mounted to the machine frame 650 and connected through a coupling 640 to a rotating shaft 601 of the patterned roller 662. The motor 633 is coupled to a primary encoder 630. A secondary encoder 651 is coupled to the tool to provide precise angular registration control of the patterned roll 662. Primary 630 and secondary 651 encoders cooperate to provide control of the patterned roll 662 to keep it in registration with a second patterned roll, as will be described further hereinafter.

Reduction or elimination of shaft resonance is important as this is a source of registration error allowing pattern position control within the specified limits. Using a coupling 640 between the motor 633 and shaft 650 that is larger than general sizing schedules specify will also reduce shaft resonance caused by more flexible couplings. Bearing assemblies 660 are located in various locations to provide rotational support for the motor arrangement.

Figure 9:
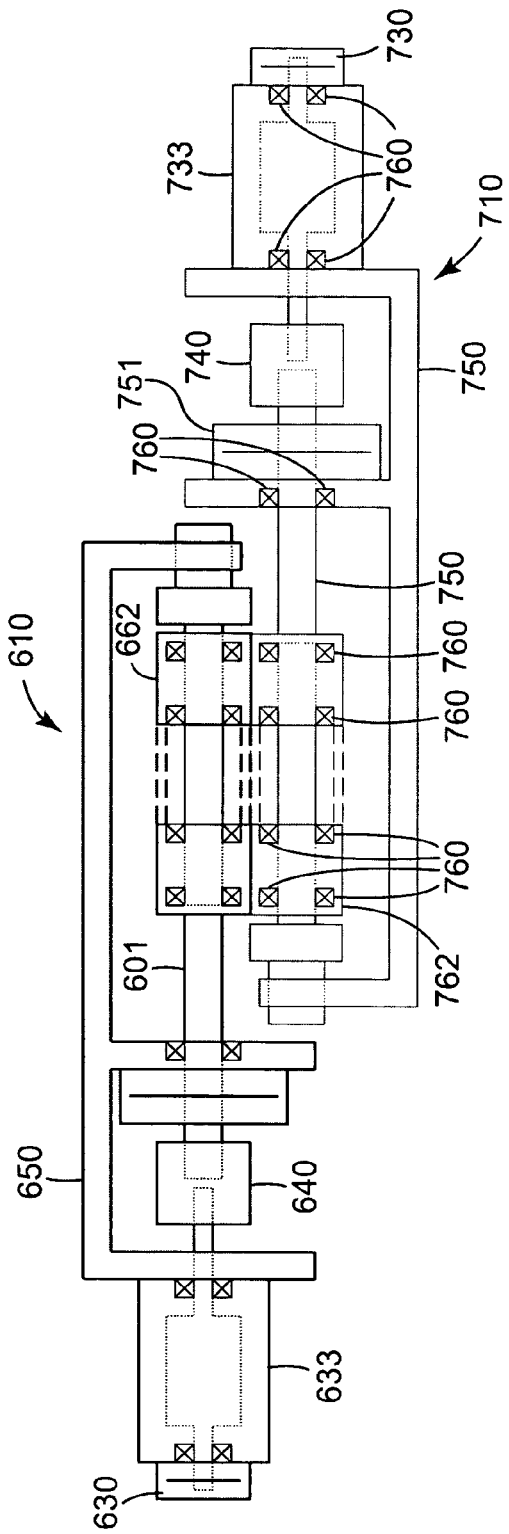
FIG. 9 illustrates a schematic view of an example embodiment of a mounting arrangement for a pair of patterned rolls according to the present disclosure.

In the example embodiment shown, the tool roller 662 diameter can be smaller than its motor 633 diameter. To accommodate this arrangement, tool rollers may be installed in pairs arranged in mirror image. In FIG. 9 two tool rollers assemblies 610 and 710 are installed as mirror images in order to be able to bring the two tool rollers 662 and 762 together. Referring also to FIG. 3, the first motor arrangement is typically fixedly attached to the frame and the second motor arrangement is positioned using movable optical quality linear slides.

Tool roller assembly 710 is quite similar to tool roller assembly 610, and includes a motor 733 for driving a tool or patterned roll 762 is mounted to the machine frame 750 and connected through a coupling 740 to a rotating shaft 701 of the patterned roller 762. The motor 733 is coupled to a primary encoder 730. A secondary encoder 751 is coupled to the tool to provide precise angular registration control of the patterned roll 762. Primary 730 and secondary 751 encoders cooperate to provide control of the patterned roll 762 to keep it in registration with a second patterned roll, as will be described further hereinafter.

Reduction or elimination of shaft resonance is important as this is a source of registration error allowing pattern position control within the specified limits. Using a coupling 740 between the motor 733 and shaft 750 that is larger than general sizing schedules specify will also reduce shaft resonance caused by more flexible couplings. Bearing assemblies 760 are located in various locations to provide rotational support for the motor arrangement.

Because the feature sizes on the microreplicated structures on both surfaces of a web are desired to be within fine registration of one another, the patterned rolls should be controlled with a high degree of precision. Cross-web registration within the limits described herein can be accomplished by applying the techniques used in controlling machine-direction registration, as described hereinafter. For example, to achieve about 10 micrometers end-to-end feature placement on a 10-inch circumference patterned roller, each roller must be maintained within a rotational accuracy of ±32 arc-seconds per revolution. Control of registration becomes more difficult as the speed the web travels through the system is increased.

Applicants have built and demonstrated a system having 10-inch circular patterned rolls that can create a web having patterned features on opposite surfaces of the web that are registered to within 2.5 micrometers. Upon reading this disclosure and applying the principles taught herein, one of ordinary skill in the art will appreciate how to accomplish the degree of registration for other microreplicated surfaces.

Figure 10:
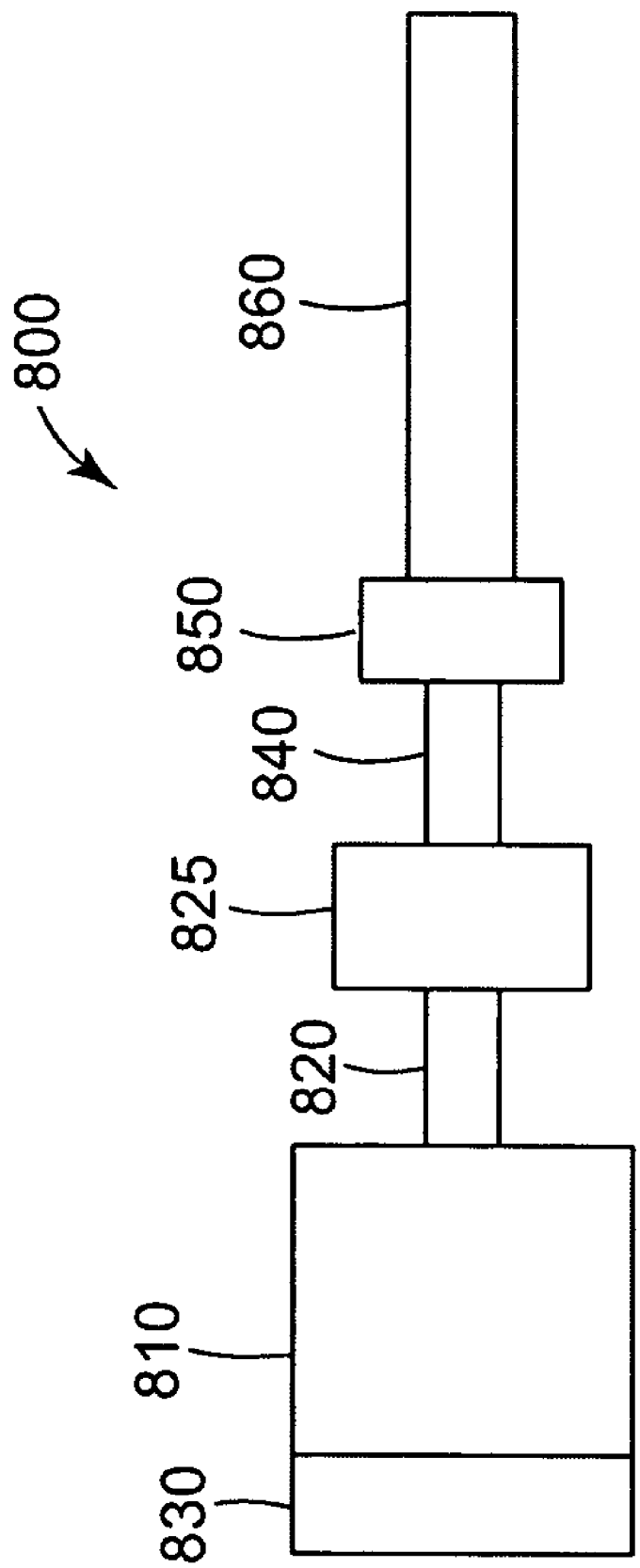
FIG. 10 illustrates a schematic view of an example embodiment of a motor and roll arrangement according to the present disclosure.

Referring to FIG. 10, a schematic of a motor arrangement 800 is illustrated. Motor arrangement 800 includes a motor 810 including a primary encoder 830 and a drive shaft 820. Drive shaft 820 is coupled to a driven shaft 840 of patterned roll 860 through a coupling 825. A secondary, or load, encoder 850 is coupled to the driven shaft 840. Using two encoders in the motor arrangement described allows the position of the patterned roll to be measured more accurately by locating the measuring device (encoder) 850 near the patterned roll 860, thus reducing or eliminating effects of torque disturbances when the motor arrangement 800 is operating.

Figure 11:
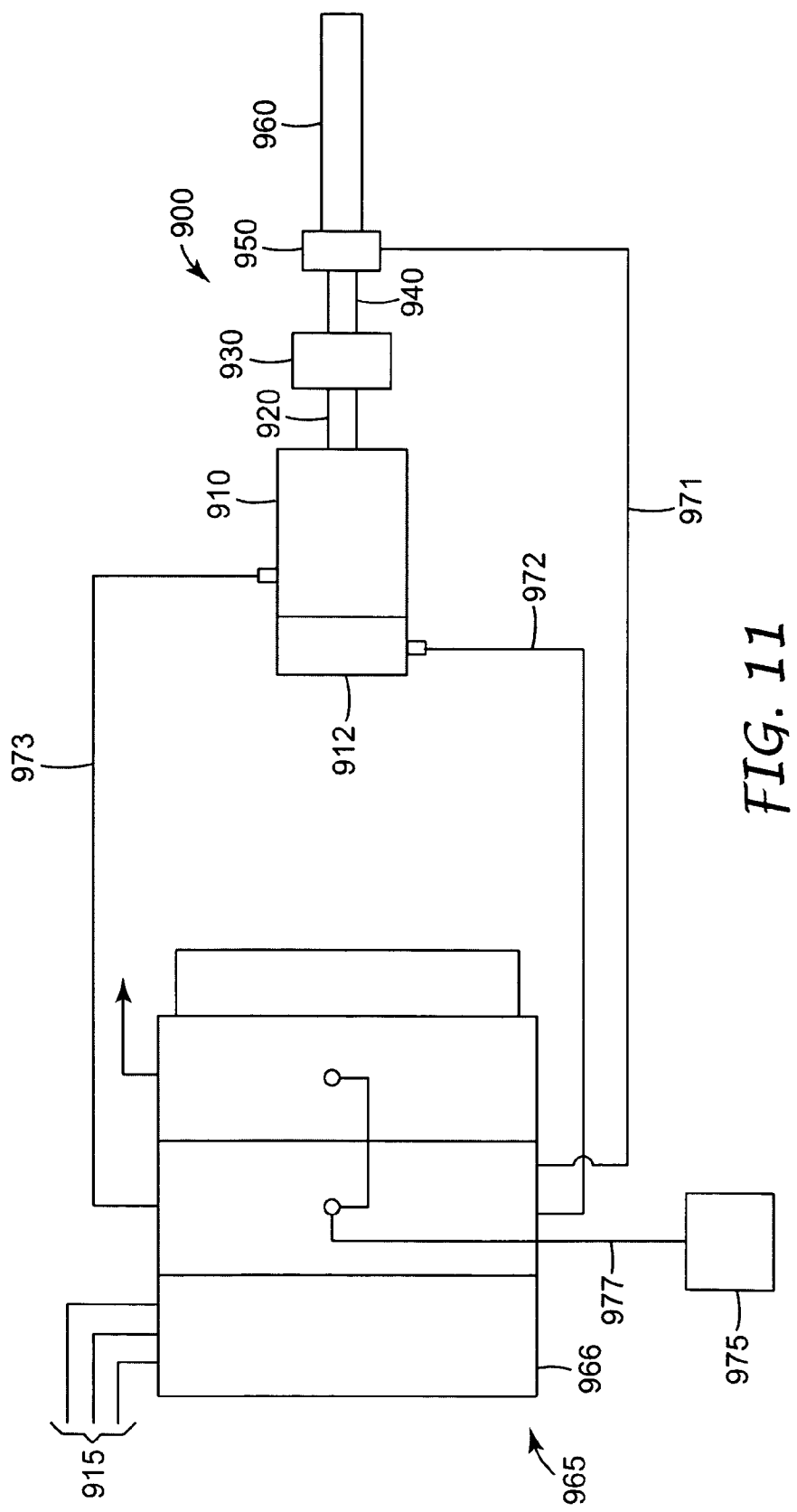
FIG. 11 illustrates a schematic view of an example embodiment of a means for controlling the registration between rolls according to the present disclosure.

Referring to FIG. 11, a schematic of the motor arrangement of FIG. 10, is illustrated as attached to control components. In the example apparatus shown in FIGS. 3-5, a similar set-up would control each motor arrangement 210 and 220. Accordingly, motor arrangement 900 includes a motor 910 including a primary encoder 930 and a drive shaft 920. Drive shaft 920 is coupled to a driven shaft 940 of patterned roll 960 through a coupling 930. A secondary, or load, encoder 950 is coupled to the driven shaft 940.

Motor arrangement 900 communicates with a control arrangement 965 to allow precision control of the patterned roll 960. Control arrangement 965 includes a drive module 966 and a program module 975. The program module 975 communicates with the drive module 966 via a line 977, for example, a SERCOS fiber network. The program module 975 is used to input parameters, such as set points, to the drive module 966. Drive module 966 receives input 480 volt, 3-phase power 915, rectifies it to DC, and distributes it via a power connection 973 to control the motor 910. Motor encoder 912 feeds a position signal to control module 966. The secondary encoder 950 on the patterned roll 960 also feeds a position signal back to the drive module 966 via to line 971. The drive module 966 uses the encoder signals to precisely position the patterned roll 960. The control design to achieve the degree of registration is described in detail below.

In the illustrative embodiments shown, each patterned roll is controlled by a dedicated control arrangement. Dedicated control arrangements cooperate to control the registration between first and second patterned rolls. Each drive module communicates with and controls its respective motor assembly.

The control arrangement in the system built and demonstrated by Applicants include the following. To drive each of the patterned rolls, a high performance, low cogging torque motor with a high-resolution sine encoder feedback (512 sine cycles×4096 drive interpolation >>2 million parts per revolution) was used, model MHD090B-035-NG0-UN, available from Bosch-Rexroth (Indramat). Also the system included synchronous motors, model MHD090B-035-NG0-UN, available from Bosch-Rexroth (Indramat), but other types, such as induction motors could also be used.

Each motor was directly coupled (without gearbox or mechanical reduction) through an extremely stiff bellows coupling, model BK5-300, available from R/W Corporation. Alternate coupling designs could be used, but bellows style generally combines stiffness while providing high rotational accuracy. Each coupling was sized so that a substantially larger coupling was selected than what the typical manufacturers specifications would recommend.

Additionally, zero backlash collets or compressive style locking hubs between coupling and shafts are preferred. Each roller shaft was attached to an encoder through a hollow shaft load side encoder, model RON255C, available from Heidenhain Corp., Schaumburg, Ill. Encoder selection should have the highest accuracy and resolution possible, typically greater than 32 arc-sec accuracy. Applicants' design, 18000 sine cycles per revolution were employed, which in conjunction with the 4096 bit resolution drive interpolation resulted in excess of 50 million parts per revolution resolution giving a resolution substantially higher than accuracy. The load side encoder had an accuracy of +/−2 arc-sec; maximum deviation in the delivered units was less than +/−1 arc-sec.

In some instances, each shaft may be designed to be as large a diameter as possible and as short as possible to maximize stiffness, resulting in the highest possible resonant frequency. Precision alignment of all rotational components is desired to ensure minimum registration error due to this source of registration error.

Figure 12:
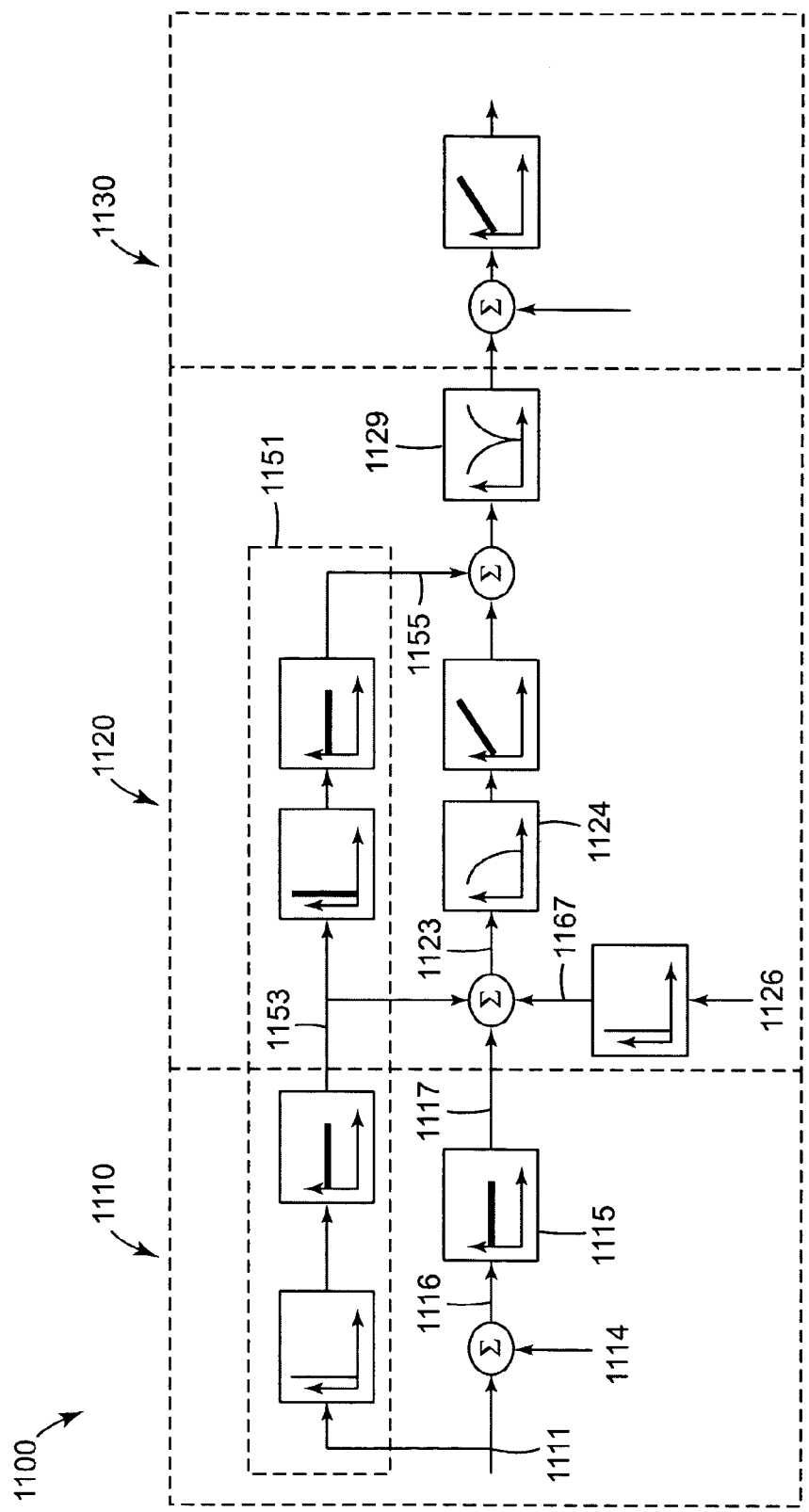
FIG. 12 illustrates a block diagram of an example embodiment of a method and apparatus for controlling registration according to the present disclosure.

Referring to FIG. 12, in Applicants' system identical position reference commands were presented to each axis simultaneously through a SERCOS fiber network at a 2 ms update rate. Each axis interpolates the position reference with a cubic spline, at the position loop update rate of 250 microsecond intervals. The interpolation method is not critical, as the constant velocity results in a simple constant times time interval path. The resolution is critical to eliminate any round off or numerical representation errors. Axis rollover must also addressed. In some cases, it is important that each axis' control cycle is synchronized at the current loop execution rate (62 microsecond intervals).

The top path 1151 is the feed forward section of control. The control strategy includes a position loop 1110, a velocity loop 1120, and a current loop 1130. The position reference 1111 is differentiated, once to generate the velocity feed forward terms 1152 and a second time to generate the acceleration feed forward term 1155. The feed forward path 1151 helps performance during line speed changes and dynamic correction.

The position command 1111 is subtracted from current position 1114, generating an error signal 1116. The error 1116 is applied to a proportional controller 1115, generating the velocity command reference 1117. The velocity feedback 1167 is subtracted from the command 1117 to generate the velocity error signal 1123, which is then applied to a PID controller. The velocity feedback 1167 is generated by differentiating the motor encoder position signal 1126. Due to differentiation and numerical resolution limits, a low pass Butterworth filter 1124 is applied to remove high frequency noise components from the error signal 1123. A narrow stop band (notch) filter 1129 is applied at the center of the motor-roller resonant frequency. This allows substantially higher gains to be applied to the velocity controller 1120. Increased resolution of the motor encoder also would improve performance. The exact location of the filters in the control diagram is not critical; either the forward or reverse path are acceptable, although tuning parameters are dependent on the location.

A PID controller could also be used in the position loop, but the additional phase lag of the integrator makes stabilization more difficult. The current loop is a traditional PI controller; gains are established by the motor parameters. The highest bandwidth current loop possible will allow optimum performance. Also, minimum torque ripple is desired.

Minimization of external disturbances is important to obtain maximum registration. This includes motor construction and current loop commutation as previously discussed, but minimizing mechanical disturbances is also important. Examples include extremely smooth tension control in entering and exiting web span, uniform bearing and seal drag, minimizing tension upsets from web peel off from the roller, uniform rubber nip roller. In the current design, a third axis geared to the tool rolls is provided as a pull roll to assist in removing the cured structure from the tool.

The web material can be any suitable material on which a microreplicated patterned structure can be created. Examples of web materials are polyethylene terephthalate, polymethyl methacrylate, or polycarbonate. The web can also be multi-layered. Since the liquid is typically cured by a curing source on the side opposite that on which the patterned structure is created, the web material must be at least partially translucent to the curing source used. Examples of curing energy sources are infrared radiation, ultraviolet radiation, visible light radiation, microwave, or e-beam. One of ordinary skill in the art will appreciate that other curing sources can be used, and selection of a particular web material/curing source combination will depend on the particular article (having microreplicated structures in registration) to be created.

An alternative to curing the liquid through the web would be to use a two part reactive cure, for example, an epoxy, which would be useful for webs that are difficult to cure through, such as metal web or webs having a metallic layer. Curing could be accomplished by in-line mixing of components or spraying catalyst on a portion of the patterned roll, which would cure the liquid to form the microreplicated structure when the coating and catalyst come into contact.

The liquid from which the microreplicated structures are created can be a curable photopolymerizable material, such as acrylates curable by UV light. One of ordinary skill in the art will appreciate that other coating materials can be used, and selection of a material will depend on the particular characteristics desired for the microreplicated structures. Similarly, the particular curing method employed is within the skill and knowledge of one of ordinary skill in the art. Examples of curing methods are reactive curing, thermal curing, or radiation curing.

Examples of coating means that useful for delivering and controlling liquid to the web are, for example, die or knife coating, coupled with any suitable pump such as a syringe or peristaltic pump. One of ordinary skill in the art will appreciate that other coating means can be used, and selection of a particular means will depend on the particular characteristics of the liquid to be delivered to the web.

Various modifications and alterations of the present disclosure will be apparent to those skilled in the art without departing from the scope and spirit of this disclosure, and it should be understood that this disclosure is not limited to the illustrative embodiments set forth herein.

What is claimed is:

1. A microreplicated achromatic lens comprising:
   a flexible substrate having first and second opposed surfaces;
   a first coated microreplicated pattern on the first surface, wherein the first coated pattern comprises a cured first liquid; and
   a second coated microreplicated pattern on the second surface, wherein the second coated pattern comprises a cured second liquid,
   wherein the first and second patterns are registered to within 10 micrometers and form an achromatic lens, and wherein the first and second cured liquids have different dispersions.

2. The achromatic lens of claim 1, wherein the first microreplicated pattern includes a plurality of non-planar lenses.

3. The achromatic lens of claim 1, wherein the first microreplicated pattern includes a plurality of aspherical or acylindrical lenses.

4. The achromatic lens of claim 1, wherein the second microreplicated pattern includes a plurality of non-planar lenses.

5. The achromatic lens of claim 1, wherein the second microreplicated pattern includes a plurality of spherical or cylindrical lenses.

6. The achromatic lens of claim 1, wherein first and second microreplicated patterns cooperate to form a plurality of achromatic lens elements.

7. The achromatic lens of claim 1, wherein the lens has a period in a range of 10 to 1000 micrometers.

8. The achromatic lens of claim 1, wherein the lens has a period in a range of 150 to 300 micrometers.

9. The achromatic lens of claim 1, wherein the lens has a period in a range of 5 to 25 micrometers.

10. The achromatic lens of claim 1, wherein the first and second patterns are registered to within 3 micrometers.

11. The achromatic lens of claim 1, wherein the lens has a height in a range of 5 to 800 micrometers.

12. The achromatic lens of claim 1, wherein the first and second patterns are registered to within 1 micrometer.

13. The achromatic lens of claim 1, wherein the first microreplicated pattern includes a plurality of positive lenses.

14. The achromatic lens of claim 13, wherein the second microreplicated pattern includes a plurality of negative lenses.

15. A method of making an article including a plurality of microreplicated achromatic lens features, the method comprising:
   providing a substrate, in web form, having first and second opposed surfaces; and
   passing the substrate through a roll to roll casting apparatus to form a plurality of achromatic lens features, wherein the achromatic lens features comprise a first microreplicated positive lens on the first surface formed from a first cured liquid and a second microreplicated negative lens on the second surface formed from a second cured liquid, wherein the first and second cured liquids have different dispersions, and wherein the first and second microreplicated lenses are registered to within about 10 micrometers.

16. The method of claim 15, wherein the passing step comprises passing the substrate through a roll to roll casting apparatus to form a plurality of achromatic lens features, wherein the achromatic lens features comprise a first microreplicated positive lens on the first surface and a second microreplicated negative lens on the second surface, and wherein the achromatic lenses have a pitch in a range of 5 to 1000 micrometers.

17. The method of claim 16, wherein the passing step comprises passing the substrate through a roll to roll casting apparatus to form a plurality of achromatic lens features, wherein the achromatic lens features comprise a first microreplicated positive lens on the first surface and a second microreplicated negative lens on the second surface, and wherein the first and second microreplicated lenses are registered to within 3 micrometers.

18. The method of claim 15, wherein the passing step comprises passing the substrate through a roll to roll casting apparatus to form a plurality of achromatic lens features, wherein the achromatic lens features comprise a first microreplicated positive lens on the first surface and a second microreplicated negative lens on the second surface, and wherein the microreplicated lenses have a height in a range of 5 to 800 micrometers.

19. The method of claim 15, wherein the passing step comprises passing the substrate through a roll to roll casting apparatus to form a plurality of achromatic lens features, wherein the achromatic lens features comprise a first microreplicated positive lens on the first surface and a second microreplicated negative lens on the second surface, and wherein the first and second microreplicated lenses are registered to within 1 micrometer.

* * * * *